United States Patent Office 2,850,470
Patented Sept. 2, 1958

2,850,470

COMBINED PROPYLENE CARBONATE AND AROMATIC HYDROCARBON SOLUTION OF A VINYL RESIN

Gerald P. Roeser, Lahaska, Pa., assignor, by mesne assignments, to American-Marietta Company, Stoner-Mudge Co. Division, Chicago, Ill., a corporation of Illinois No Drawing. Application August 31, 1956
Serial No. 607,287

7 Claims. (Cl. 260—30.4)

This invention relates to the use of propylene carbonate in conjunction with aromatic hydrocarbon solvents to dissolve certain resins, especially copolymers of vinyl chloride and vinyl acetate.

Vinyl polymers and copolymers have become well known in many industries for their valuable properties, and one phase of their development has been a search for suitable solvents to form solutions of the polymers for various purposes, such as protective coatings, films, and various other plastic applications. There are a number of active solvents which have been found to be generally suitable for such purposes, such as isophorone, cyclohexanone and methyl ethyl ketone. Such active solvents are expensive, however, and consequently attempts have been made to find less expensive substitutes. The common aromatic hydrocarbon solvents are much less expensive, but they can be used only as diluents with more active solvents to dissolve most vinyl polymers and copolymers, with rare exceptions; e. g., straight aromatic hydrocarbon solvents with vinyl chloride/vinylidene chloride copolymers as disclosed in Gray and Reymann U. S. Patent 2,675,334. In the case of copolymers of vinyl chloride and vinyl acetate, which are among the most widely accepted and useful of the vinyl compounds, particularly in the protective coating field, it is necessary to use expensive active solvents, either exclusively or in relatively large proportions with aromatic hydrocarbon solvents, in order to dissolve the vinyl chloride/vinyl acetate copolymers sufficiently to obtain the desired viscosity. The resultant expense and other difficulties have led to a long continued search for other solvent materials which could be used in smaller proportions with aromatic hydrocarbon solvents for obtaining suitable solutions of vinyl chloride/vinyl acetate copolymers.

I have discovered that there is a synergistic relation between propylene carbonate and liquid aromatic hydrocarbons such as benzene, toluene and xylene, and mixtures thereof, whereby the combination of the two is highly effective when used with certain resins, particularly copolymers of vinyl chloride and vinyl acetate containing less than 90% by weight of vinyl chloride. The structural formula of propylene carbonate may be expressed as follows:

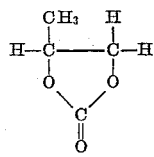

There is evidently a special relation between the propylene carbonate component of the solvent system and the aromatic hydrocarbon component, because neither one of the components used alone is capable of dissolving these resins, but the combination of the two components is highly effective in dissolving them. The combination is particularly valuable because of its usefulness as a solvent for vinyl chloride/vinyl acetate copolymers, which are of major commercial importance, and because a very high percentage of the aromatic hydrocarbon component, which is relatively inexpensive, can be used in the solvent mixture for purposes of dissolving vinyl chloride/vinyl acetate copolymers, in spite of the fact that such copolymers are noted for their resistance to dissolution in conventional solvent mixtures containing like percentages of such aromatic hydrocarbon component.

The solvent composition of the invention consists of the combination of propylene carbonate with benzene, toluene or xylene, or mixtures thereof. When used as a solvent for copolymers of vinyl chloride and vinyl acetate containing about 87% by weight of vinyl chloride, the composition of the invention is effective in a range of proportions of propylene carbonate of about 9% to about 75% by weight (the balance being benzene, toluene, or xylene, or mixtures thereof). As the proportion of vinyl chloride in the copolymer is decreased below 87% the greater solvency of the vinyl acetate in the copolymer makes the composition of the invention effective as a solvent for the copolymer with a progressively smaller minimum and larger maximum proportion of propylene carbonate.

The following Table I shows the effectiveness of propylene carbonate as compared with cyclohexanone and isophorone when used in various proportions with xylene, in terms of viscosities (in seconds at 80° F. with #4 Ford cup) of compositions consisting of uniform samples of vinyl chloride/vinyl acetate copolymer (87/13 ratio, "VYHH") at 18% solids by weight in the various solvent mixtures (component ratios by weight):

TABLE I.—COMPARATIVE VISCOSITIES
[Seconds at 80° F. with a #4 Ford cup.]

| Ratios of solvent components in col. headings (1), (2), (3) | Viscosities of 18% solids "VYHH" in the following solvent combinations— | | |
|---|---|---|---|
| | (1) Cyclohexanone and xylene | (2) Isophorone and xylene | (3) Propylene carbonate and xylene |
| 100/0 | 75 | 127 | Swollen. |
| 95/5 | 69 | 103 | Do. |
| 75/25 | 52 | 89 | 155. |
| 50/50 | 42 | 62 | 67. |
| 33/67 | 42 | 60 | 50. |
| 25/75 | 47 | 68 | 47. |
| 15/85 | 68 | Gel | 52. |
| 10/90 | Swollen | Swollen | 87. |
| 9/91 | do | do | 94. |
| 7.5/92.5 | do | do | Swollen. |
| 5/95 | do | do | Do. |
| 4/96 | do | do | Do. |
| 0/100 | Insol | Insol | Insol. |

The following Table II shows the effect of using various aromatic hydrocarbon components in various proportions with propylene carbonate, in terms of viscosity (in seconds at 80° F. with #4 Ford cup) of compositions consisting of uniform samples of vinyl chloride/vinyl acetate copolymer (87/13 ratio, "VYHH") at 18% solids by weight in the various solvent mixtures:

TABLE II.—COMPARATIVE VISCOSITIES WHEN USING PROPYLENE CARBONATE WITH DIFFERENT AROMATIC HYDROCARBONS
[Seconds at 80° F. with a #4 Ford cup.]

| Ratio of propylene carbonate to the aromatic hydrocarbon specified in adjacent headings (by weight) | Viscosities of 18% solids "VYHH" in combinations of propylene carbonate with— | | | |
|---|---|---|---|---|
| | Benzene | Toluene | Xylene | Solvesso #100 |
| 100/0 | Swollen | Swollen | Swollen | Swollen. |
| 75/25 | 160 | 146 | 155 | 178. |
| 50/50 | 64 | 62 | 67 | 88. |
| 25/75 | 48 | 42 | 47 | Gel. |
| 0/100 | Insol | Insol | Insol | Insol. |

In the above Table II, "Solvesso #100" (Esso Standard Oil Co., New York, N. Y.) is a commercial mixed aromatic hydrocarbon solvent. When commercial naphthene spirits, such as "Troluoil" and "Apco Thinner" (Anderson-Prichard Corp., Oklahoma City, Oklahoma), or aliphatic hydrocarbons, such as "Stodsol" (Anderson-Prichard Corp.), are used with propylene carbonate in any proportions as a solvent for the same copolymer, the results are total insolubility or close to it.

The following Table III shows the effectiveness of propylene carbonate and xylene with various kinds of vinyl resins, in terms of comparative viscosities (in seconds at 80° F. with #4 Ford cup) when using propylene carbonate and xylene separately and in various combined proportions, with the resins:

TABLE III.—COMPARATIVE VISCOSITIES WITH DIFFERENT RESINS

[Seconds at 80° F. with a #4 Ford cup.]

| Resin | Percent total solids | Ratio propylene carbonate/xylene (by weight) | | | | |
|---|---|---|---|---|---|---|
| | | 100/0 | 95/5 | 50/50 | 10/90 | 0/100 |
| "VYHH" | 18 | Swollen | Swollen | 67 | 87 | Insol. |
| "VYLF" | 20 | do | Gel | 21 | 19 | Insol. |
| "VMCH" | 18 | Gel | 500 | 85 | Swollen | Insol. |
| "VAGH" | 18 | Gel | | 248 | do | Insol. |
| "VYNS" | 18 | Swollen | | Gel | do | Insol. |
| "QYNV" | 10 | Insol | | Insol | | Insol. |
| "EXON 402" | 10 | Insol | | Gel | | Insol. |
| "Geon 200X 20" | 30 | Swollen | | 222 | | 190. |

In the above Table III, "VYHH" and "VYLF" (Union Carbide and Carbon Corporation, New York, N. Y.) are copolymers of vinyl chloride and vinyl acetate in proportions of 87/13 by weight, the difference between the two lying in the fact that "VYHH" has a higher molecular weight. "VMCH" (Union Carbide and Carbon Corp.) is a copolymer of vinyl chloride, vinyl acetate and maleic anhydride, in proportions by weight of 86/13/1. "VAGH" (Union Carbide and Carbon Corp.) is a partially hydrolyzed copolymer of vinyl chloride and vinyl acetate, the copolymer being originally like "VYHH," but changed by hydrolysis to proportions by weight of 6% vinyl alcohol, 3% vinyl acetate and 91% vinyl chloride. "VYNS" (Union Carbide and Carbon Corp.) is a copolymer of vinyl chloride and vinyl acetate in proportions by weight of 90/10. "QYNV" (Union Carbide and Carbon Corp.) and "Exon 402" (Firestone Plastics Co., Pottstown, Pennsylvania), are polymers consisting entirely of polyvinyl chloride, and "Geon 200×20" (B. F. Goodrich Chemical Co., Cleveland, Ohio), is a copolymer of vinyl chloride and vinylidine chloride.

The mixed solvent of the invention is effective with copolymers of vinyl chloride and vinyl acetate containing less than 90% by weight of vinyl chloride. There is no upper limit on the amount of vinyl acetate in the copolymer because the vinyl acetate component is relatively easily dissolved. For example, 100% vinyl acetate polymer is soluble in all mixtures of propylene carbonate and xylene containing about 9% to about 75% by weight of propylene carbonate, the balance being xylene.

Compositions employing the polymer and solvent combination of the invention are useful for protective coating and other purposes for which vinyl chloride/vinyl acetate solutions are used. For example, a composition of the above-described "VYHH" vinyl chloride/vinyl acetate copolymer at 18% applied solids in solvent consisting of 67% xylene and 33% propylene carbonate was filmed on tinplate at about 4.7 mg./sq. in. and baked thereon at about 335° F. for ten minutes. The coating was tested for color, clarity, flow, adhesion, insolubility, flexibility, and, after pasteurization at 170° F. for 45 minutes, for blistering, spotting and wet adhesion. For purposes of comparsion, a composition of the same copolymer at 19.5% applied solids in solvent consisting of 67% toluene and 33% methyl ethyl ketone was filmed on like specimens at 5.3 mg./sq. in. and then baked and tested as stated above. The results were essentially the same in both cases, showing that coating qualities are not adversely affected by substitution of propylene carbonate for such standard solvents as methyl ethyl ketone in coating compositions of vinyl chloride/vinyl acetate copolymers. The composition of the invention can have a viscosity range of 20 to 150 seconds in #4 Ford cup at 80° F., and a solids concentration of vinyl chloride/vinyl acetate copolymer of up to about 21% by weight, for most protective coating purposes, but these ranges can be exceeded for some protective coating purposes.

Pigments, dyes, waxes and other non-reactants may be added to the composition of the invention for decorative purposes and the like, without otherwise materially affecting the significant characteristics of the composition.

While I have described present preferred embodiments of the invention and methods of practicing the same, it will be recognized that the invention is not limited thereto but may be otherwise variously embodied and practiced within the scope of the following claims.

I claim:

1. A resin solution comprising a copolymer of vinyl chloride and vinyl acetate containing less than 90% by weight of vinyl chloride in said copolymer, said copolymer being dissolved in a solvent medium consisting essentially of an aromatic hydrocarbon selected from the group consisting of benzene, toluene, xylene, and mixtures thereof, and propylene carbonate, said mixture containing from 9% to about 75% by weight of propylene carbonate based on the combined weight of said propylene carbonate and aromatic hydrocarbon.

2. A resin solution as recited in claim 1 in which said copolymer of vinyl chloride and vinyl acetate contains not more than about 87% by weight of vinyl chloride.

3. A resin solution as recited in claim 1 in which said aromatic hydrocarbon is xylene.

4. A resin solution as recited in claim 1 in which said copolymer of vinyl chloride and vinyl acetate contains substantially 87% by weight of vinyl chloride.

5. A resin solution as recited in claim 4 in which said propylene carbonate is present in an amount of about 9% by weight.

6. A resin solution comprising a copolymer of vinyl chloride and vinyl acetate containing less than 90% by weight of vinyl chloride in said copolymer, said copolymer being dissolved in a solvent medium consisting essentially of an aromatic hydrocarbon selected from the group consisting of benzene, toluene, xylene and mixtures thereof, and propylene carbonate, said mixture containing from 25% to 50% by weight of propylene carbonate based on the combined weight of said propylene carbonate and aromatic hydrocarbon.

7. A resin solution as recited in claim 6 in which said aromatic hydrocarbon is xylene.

References Cited in the file of this patent

UNITED STATES PATENTS

| 2,764,469 | Kowolik et al. | Sept. 25, 1956 |
| 2,769,792 | Ham | Nov. 6, 1956 |